United States Patent
Xiao et al.

(10) Patent No.: US 12,308,948 B2
(45) Date of Patent: May 20, 2025

(54) COMMUNICATION STATION, OPTICAL COMMUNICATION SYSTEM, DATA TRANSMISSION METHOD, AND STORAGE MEDIUM

(71) Applicant: ACCELINK TECHNOLOGIES CO., LTD., Wuhan (CN)

(72) Inventors: Li Xiao, Wuhan (CN); Jiekui Yu, Wuhan (CN); Gang Lu, Wuhan (CN); Zhaoxia Liu, Wuhan (CN); Qianggao Hu, Wuhan (CN); Liyan Huang, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 169 days.

(21) Appl. No.: 18/041,387

(22) PCT Filed: Dec. 22, 2020

(86) PCT No.: PCT/CN2020/138425
§ 371 (c)(1),
(2) Date: Feb. 10, 2023

(87) PCT Pub. No.: WO2022/032961
PCT Pub. Date: Feb. 17, 2022

(65) Prior Publication Data
US 2023/0299867 A1    Sep. 21, 2023

(30) Foreign Application Priority Data
Aug. 13, 2020    (CN) .......................... 202010812736.4

(51) Int. Cl.
*H04J 14/02*    (2006.01)
*H04B 10/079*    (2013.01)

(52) U.S. Cl.
CPC .... *H04J 14/0287* (2013.01); *H04B 10/07955* (2013.01); *H04J 14/0212* (2013.01)

(58) Field of Classification Search
CPC ............... H04J 14/0287; H04J 14/0212; H04J 14/0291; H04J 14/02762; H04B 10/07955; H04B 10/032; H04B 10/038
(Continued)

(56) References Cited

U.S. PATENT DOCUMENTS 9,621,260 B2 *    4/2017    Gerstel .............. H04Q 11/0005
9,660,758 B2 *    5/2017    Grobe ............... H04J 14/02122
(Continued)

FOREIGN PATENT DOCUMENTS

CN    1305668 A    7/2001
CN    1372398 A    10/2002
(Continued)

OTHER PUBLICATIONS

International Search Report issued in International Application No. PCT/CN2020/138425, dated Apr. 27, 2021.
(Continued)

*Primary Examiner* — Abbas H Alagheband
(74) *Attorney, Agent, or Firm* — Knobbe Martens Olson & Bear LLP

(57) ABSTRACT

Provided are a communication station, an optical communication system, a data transmission method, and a storage medium. The communication station is a first station including: a first reconfigurable optical add-drop multiplexing ROADM device, including a first port used to connect a cable in a first direction of a network; a second ROADM device connected to the first ROADM device and including a second port which may be used to connect a cable in a second direction of the network being different from the first direction; an optical protection device connected to each of
(Continued)

the first and second ROADM devices and used to control the first station to transmit communication with a second station for a corresponding service in the first direction corresponding to the first ROADM device, or to transmit communication with the second station for a corresponding service in the second direction corresponding to the second ROADM device.

14 Claims, 6 Drawing Sheets

(58) Field of Classification Search
USPC .................................................. 398/7
See application file for complete search history.

(56) References Cited

U.S. PATENT DOCUMENTS

| | | | | |
|---|---|---|---|---|
| 10,511,401 | B2* | 12/2019 | Jones | H04J 14/0227 |
| 2011/0013507 | A1* | 1/2011 | Gazzola | H04L 45/28 |
| | | | | 370/216 |
| 2011/0274425 | A1* | 11/2011 | Grobe | H04J 14/0212 |
| | | | | 398/3 |
| 2014/0169782 | A1* | 6/2014 | Hashiguchi | H04J 14/0291 |
| | | | | 398/5 |
| 2016/0127034 | A1* | 5/2016 | Wellbrock | H04J 14/02122 |
| | | | | 398/2 |
| 2019/0103934 | A1* | 4/2019 | Jones | H04J 14/0212 |
| 2020/0083976 | A1* | 3/2020 | Jones | H04J 14/021 |
| 2020/0092027 | A1* | 3/2020 | Yu | H04J 14/0272 |
| 2020/0374025 | A1* | 11/2020 | Jones | H04J 14/029 |

FOREIGN PATENT DOCUMENTS

| | | |
|---|---|---|
| CN | 101166069 A | 4/2008 |
| CN | 101582735 A | 11/2009 |
| CN | 101588219 A | 11/2009 |
| CN | 102437875 A | 5/2012 |
| CN | 102572622 A | 7/2012 |
| CN | 103222215 A | 7/2013 |
| CN | 103281152 A | 9/2013 |
| CN | 104022927 A | 9/2014 |
| CN | 104868968 A | 8/2015 |
| CN | 105049112 A | 11/2015 |
| CN | 205596117 U | 9/2016 |
| CN | 108989913 A | 12/2018 |
| CN | 109088777 A | 12/2018 |
| CN | 109600687 A | 4/2019 |
| CN | 111342891 A | 6/2020 |
| CN | 112019262 A | 12/2020 |
| EP | 1064739 B1 | 1/2001 |
| EP | 2924891 A1 | 9/2015 |
| WO | WO 2012/159341 A1 | 11/2012 |

OTHER PUBLICATIONS

Li et al., "Intelligent metro optical networks and key optical components", Telecommunications Science, 35(4): 33-40, 2019.
Search Report issued in Chinese Application No. 202010812736.4, dated Apr. 14, 2021.
Sato et al., "Disruption-Free Expansion of Protected Optical Path Networks that Utilize Subsystem Modular OXC Nodes", J. Opt. Commun. Netw., 8(7): 476-485, Jul. 2016.
Supplementary Search issued in Chinese Application No. 202010812736.4, dated Jul. 12, 2021.
Supplementary Search issued in Chinese Application No. 202010812736.4, dated Aug. 10, 2021.
Supplementary Search issued in Chinese Application No. 202010812736.4, dated Jan. 7, 2022.

* cited by examiner

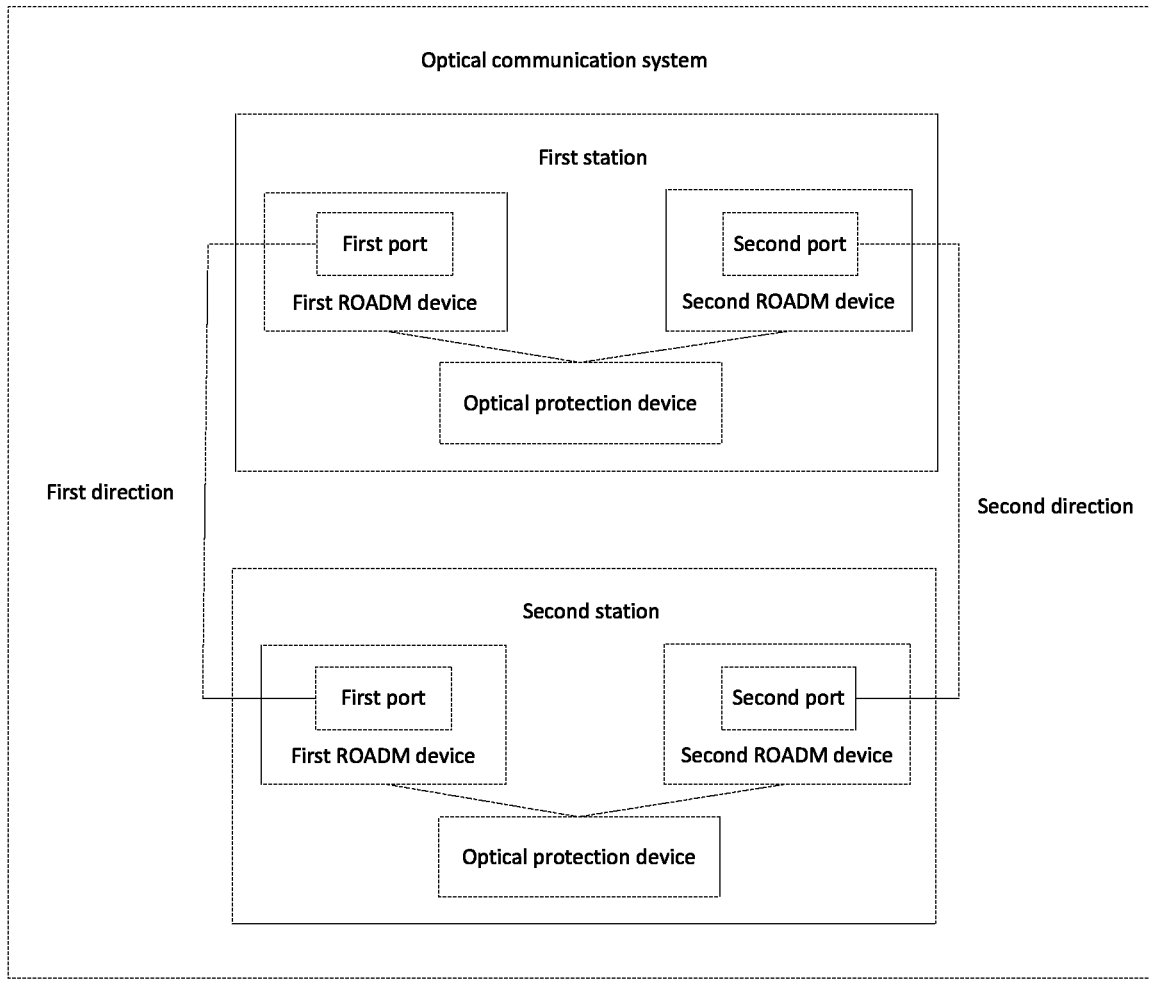

FIG. 5

Detect whether there is a communication abnormality when communication with a second station for a corresponding service is transmitted in a first direction corresponding to a first ROADM device included in the first station — 601

Switch the communication to the second direction corresponding to the second ROADM device included in the first station to communicate with the second station for corresponding services when an abnormal communication is detected — 602

FIG. 6

COMMUNICATION STATION, OPTICAL COMMUNICATION SYSTEM, DATA TRANSMISSION METHOD, AND STORAGE MEDIUM

CROSS-REFERENCE

The present disclosure claims a benefit of, and priority to Chinese Patent Application No. 202010812736.4 filed on Aug. 13, 2020, the disclosure of which is hereby expressly incorporated by reference herein in its entirety.

TECHNICAL FIELD OF THE DISCLOSURE

The present disclosure relates to but is not limited to the technical field of optical communication, and particularly relates to a communication station, an optical communication system, a data transmission method, and a storage medium.

BACKGROUND

A reconfigurable optical add-drop multiplexing (ROADM) device is a device used in a wavelength division multiplexing (WDM) optical network system, which may arbitrarily assign up and down services according to the needs of the network wavelength to achieve flexible scheduling of services.

In related technologies, the optical layer service protection method of the optical network usually adopts a 1+1 optical fiber line automatic switching protection of the traditional optical transmission network, but this method requires each optical fiber link in the optical network to have a backup optical fiber; however, in the actual network, not all fiber links have a backup optical fiber. And the 1+1 optical fiber line automatic switching protection that only protects the optical fiber link cannot protect the apparatus in the communication station from a failure. Therefore, the 1+1 optical fiber line automatic switching protection method cannot achieve a high optical protection efficiency for the optical layer services of the optical network.

SUMMARY

Embodiments of the present disclosure provide a communication station, an optical communication system, a data transmission method, and a storage medium.

Embodiments of the present disclosure provide a communication station, wherein the communication station is a first station including:
  a first reconfigurable optical add-drop multiplexing ROADM device including a first port which is capable of being used to connect a cable in a first direction of a network;
  a second ROADM device connected to the first ROADM device and including a second port which is capable of being used to connect a cable in a second direction of the network, wherein the second direction is different from the first direction;
  an optical protection device whose number is consistent with a number of a service type transmitted by the communication station;
  wherein the optical protection device is respectively connected to the first ROADM device and the second ROADM device, and is used to control the first station to transmit communication for performing a corresponding service with the second station in the first direction corresponding to the first ROADM device, or transmit communication for performing the corresponding service with the second station in the second direction corresponding to the second ROADM device.

Embodiments of the present disclosure also provide an optical communication system, including:
  at least two communication stations as described in one or more of the aforementioned technical solutions;
  wherein communication is capable of being performed between the two communication stations in a first direction or a second direction, and the second direction is different from the first direction.

Embodiments of the present disclosure further provide a data transmission method which is applied to a first station and includes:
  detecting whether a communication abnormality occurs when communication with the second station for a corresponding service is performed by transmitting in a first direction corresponding to the first ROADM device which is included in the first station;
  when the communication abnormality is detected, switching the communication to transmit the communication with the second station for a corresponding service in a second direction corresponding to the second ROADM device included in the first station.

Embodiments of the present disclosure also provide a computer readable storage medium, on which computer executable instructions are stored, wherein when the computer executable instructions are executed by a processor, one or more of the aforementioned data transmission methods supplied by the technical solutions is capable of being implemented.

In the communication station, the optical communication system, the data transmission method, and the storage medium provided by the embodiments of the present disclosure, the first station includes the first ROADM device, the second ROADM device, and the optical protection devices corresponding to different service types. Communication is performed with the second station in two different directions through the first ROADM device and the second ROADM device; and the optical protection device in the first station which corresponds to the service of the second station is connected to the first ROADM device and the second ROADM device respectively. The optical protection device controls the first station to perform service communication with the second station in the first direction corresponding to the first ROADM device, or to perform service communication with the second station in the second direction corresponding to the second ROADM device.

By providing optical protection devices in the communication station whose number corresponds to the number of transmission service types, grouping protection for different types of services is realized; for the same type of services, the optical protection devices are respectively connected to the first ROADM device and the second ROADM device, whereby two transmission links in different directions are formed between the communication stations, so as to protect the service communication between the communication stations. Moreover, since the communication station includes two ROADM devices, when the ROADM device fails, the service communication is continued through the other ROADM device, thereby realizing the protection of the ROADM device.

BRIEF DESCRIPTION OF THE DRAWINGS

FIG. 5 is a schematic structural diagram of an optical communication system provided by an embodiment of the present disclosure;

FIG. 6 is a schematic flowchart of a data transmission method provided by an embodiment of the present disclosure;

DETAILED DESCRIPTION

In order to make the purpose, technical solutions and advantages of the embodiments of the present disclosure clearer, the specific technical solutions of the present disclosure will be further described in detail below in conjunction with the drawings in the embodiments of the present disclosure. The following examples are used to illustrate the present disclosure, but not to limit the scope of the present disclosure.

There are three main protection methods for optical layer services:
(1) 1+1 Optical Fiber Line Auto Switch Protection (OLP); this method requires each optical fiber link to have a backup optical fiber, but in practical applications, not all optical fiber links have a backup optical fiber; and the OLP method that only protects optical fiber lines cannot protect the ROADM devices from failures;
(2) Optical Channel Protection (OCHP) based on a single wavelength; this method requires a large number of optical switches, one for each channel;
(3) ROADM reconfiguring route; the protection switching time may be rather long because the route configuration time of the ROADM device is rather long.

Figure 1:
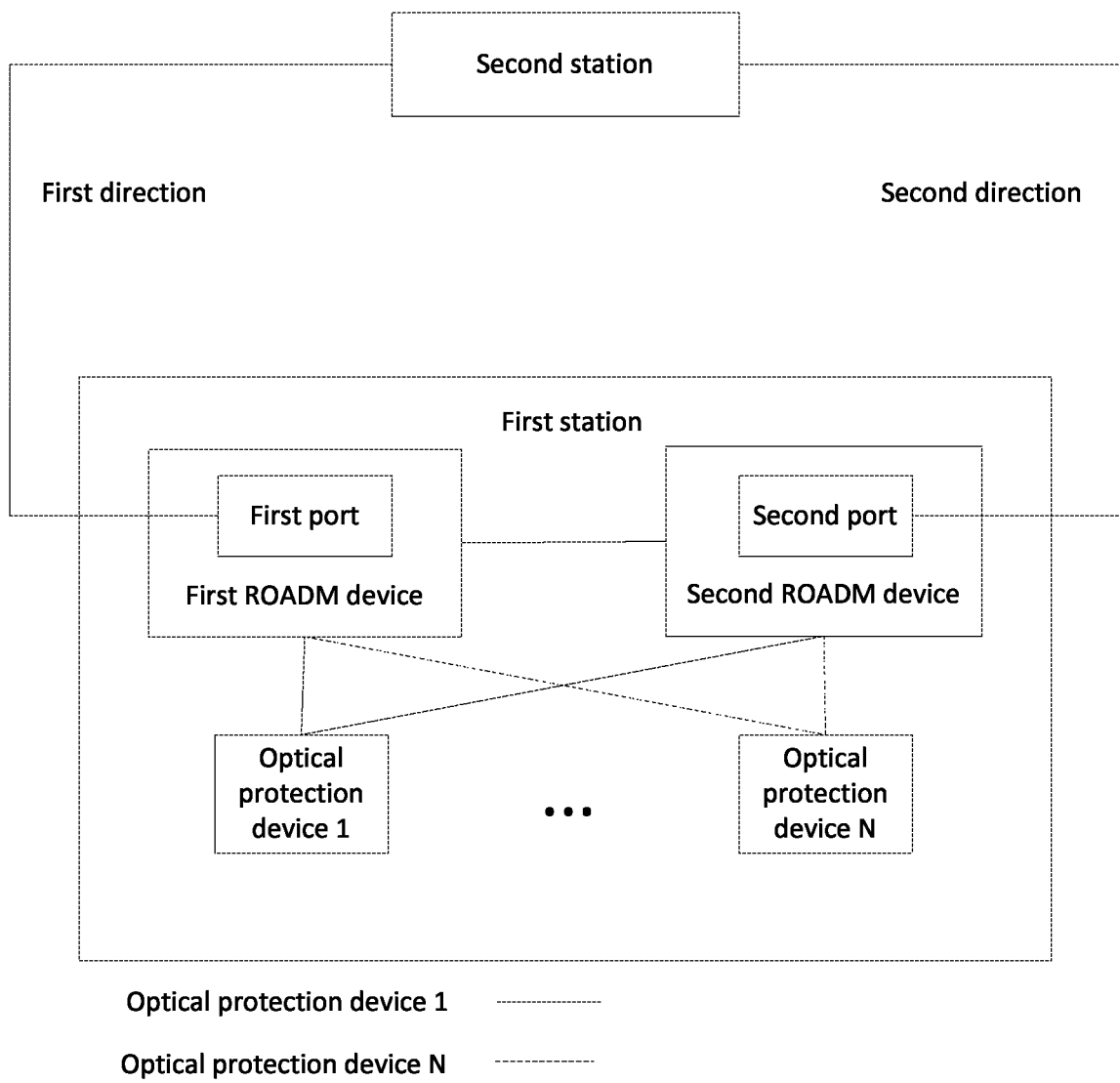
FIG. 1 is a schematic block diagram of a composition structure of a communication station provided by an embodiment of the present disclosure.

Based on these above, an embodiment of the present disclosure provides a communication station as shown in FIG. 1 which is a schematic block diagram of a composition structure of a communication station provided by an embodiment of the present disclosure. The communication station is a first station including:

a first ROADM device including a first port which is capable of being used to connect to a cable in a first direction of the network;

a second ROADM device connected to the first ROADM device and including a second port which is capable of being used to connect a cable in a second direction of the network, wherein the second direction is different from the first direction;

an optical protection device, wherein the number of the optical protection device is consistent with a number of a service type transmitted by the communication station;

wherein the optical protection device is respectively connected to the first ROADM device and the second ROADM device, and is used to control the first station to perform communication for a corresponding service with the second station in the first direction corresponding to the first ROADM device, or perform communication for the corresponding service with the second station in the second direction corresponding to the second ROADM device.

The communication station provided by the embodiments of the present disclosure is applicable to any communication station in a ring network optical layer service protection scenario.

In the embodiments of the present disclosure, the optical protection device is a transmission device working at an optical layer, for example, an OLP device. An optical protection device has the characteristics that signals are transmitted in a manner of independent and transparent, safe and reliable, and could recover fast from faults.

It should be noted that, according to different working models, the optical protection devices can be classed as 1+1 optical protection devices and 1:1 optical protection devices. Among them, at a transmitting end, the 1+1 optical protection device splits a received optical signal and simultaneously transmits it to the network from the two connected optical fiber lines; and at a receiving end, the 1+1 optical protection device selects and receives one optical signal according to the power of two received optical signals. While the 1:1 optical protection device selects one optical fiber line as the main line from the two connected optical fiber lines, and transmits the received optical signal to the network through the main line; and at the receiving end, if it detects that the optical signal power of the main line drops, the 1:1 optical protection device will automatically switch the transmission signal route from the main line to the backup line. At the same time, the 1:1 optical protection device at the transmitting end will also switch the line to the backup line synchronously.

In practical applications, the first station includes multiple optical protection devices, wherein the number of the optical protection devices is consistent with the number of the service type transmitted by the communication station.

Here, the type of service transmitted by a communication station may be determined by the station with which it previously communicates. For example, an optical protection device 1 is responsible for the service of communication between the first station and the second station, and an optical protection device 2 is responsible for the service of communication between the first station and the third station, etc., which are not specifically limited here.

In the embodiments of the present disclosure, the ROADM device is a device or apparatus used in a dense wavelength division multiplexing system, and is used for dynamically adding or dropping service optical signals through remote reconfiguration.

In practical applications, the first station at least includes two ROADM devices, which are used to connect cables in different directions of the network, so that there are at least two communication cables in different directions between the first station and the second station.

In some embodiments, the first ROADM device and the second ROADM device are further configured that when the first ROADM device fails, the first station transmits the service communication with the second station in the second direction corresponding to the second ROADM device, or when the second ROADM device fails, the first station transmits service communication with the second station in the first direction corresponding to the first ROADM device.

In an embodiment of the present disclosure, the first station includes an optical protection device, a first ROADM device, and a second ROADM device. The optical protection device is respectively connected to the first ROADM device and the second ROADM device. In addition, the first port on the first ROADM device is connected to the network through a cable in the first direction, and the second port on the second ROADM device is connected to the network through a cable in the second direction. In this way, there are two transmission paths in different directions between the first station and the second station. The first station is controlled by the optical protection device to perform service communication with the second station in the first direction corresponding to the first ROADM device, or perform service communication with the second station in the second direction corresponding to the second ROADM device.

As a result, the services of the communication stations are grouped and protected according to different service types; and for the same type of service, the service communication is protected through two transmission links in different directions. Moreover, since the communication station includes two ROADM devices, when the ROADM device fails, the service communication is continued through the other ROADM device, thereby realizing the protection of the ROADM device.

Figure 2:
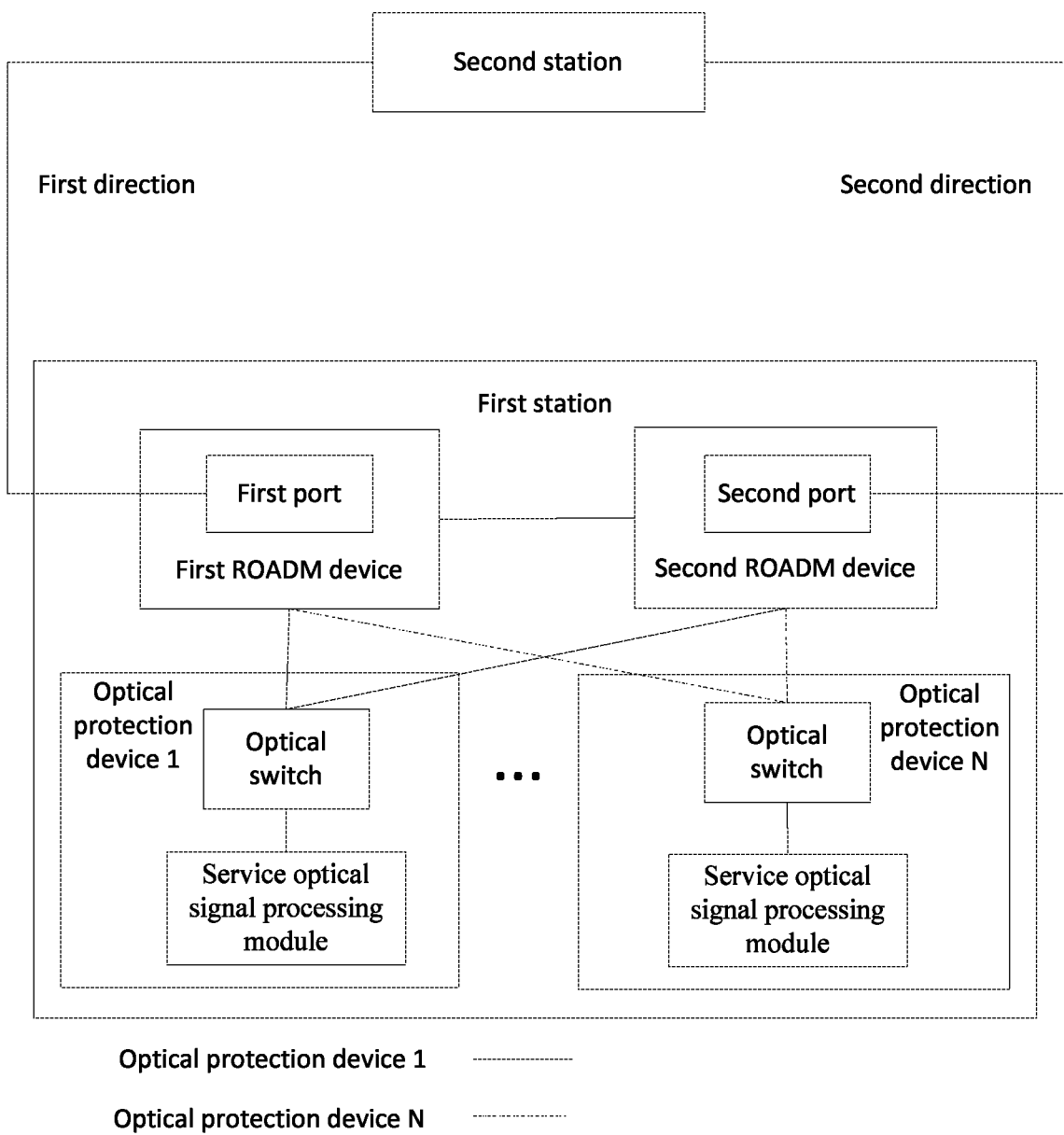
FIG. 2 is a schematic block diagram of an alternative composition structure of a communication station provided by an embodiment of the present disclosure.

In some embodiments, the optical protection device further includes a transceiver. FIG. 2 is a schematic block diagram of an alternative composition structure of a communication station provided by an embodiment of the present disclosure. As shown in FIG. 2, the transceiver includes:

a service optical signal processing module used to send and receive service optical signals;

an optical switch including an input end connected to the service optical signal processing module, and an output end connected to the first ROADM device or the second ROADM device.

Here, the service optical signal refers to an optical signal for carrying service data.

In the embodiments of the present disclosure, the service optical signal processing module is an optoelectronic device used for photoelectric and electro-optical conversion. For example, according to different packaging types, the service optical signal processing module may be an XFP optical module, an SFP optical module, etc., which will not be specifically limited here.

It should be noted that the service optical signal processing module includes an optical transmitting device, an optical receiving device, a boost circuit, and a microprocessor (Microcontroller Unit, MCU). Among them, the optical transmitting device, such as a laser chip, is used to convert electrical signals into optical signals; the optical receiving device, such as an avalanche diode, is used to convert optical signals into electrical signals; the boost circuit is used to provide a bias voltage for the optical receiving device; and the MCU is used to control the output voltage of the boost circuit.

In the embodiments of the present disclosure, the optical switch is an optical device with one or more alternative transmission ports, and is used for physically switching or logically operating an optical signal in an optical transmission line or an integrated optical circuit. Among them, according to the number of input and output ends of the optical switch, the optical switch may be divided into a 1×1 optical switch, a 1×2 optical switch, a 1×N optical switch, a 2×2 optical switch, a M×N optical switch and so on. Here, M is the number of input ends of the optical switch, and N is the number of output ends.

In practical applications, the number of the output ends of the optical switch may be determined according to the number of the ROADM devices in the first station, so as to select the corresponding optical switch.

In the embodiments of the present disclosure, the optical protection device further includes a transceiver which includes a service optical signal processing module and an optical switch.

The service optical signal processing module is connected to the input end of the optical switch, and the output end of the optical switch is connected to the first ROADM device or the second ROADM device.

The service optical signal processing module receives the service optical signal transmitted in the first direction corresponding to the first ROADM device or the second direction corresponding to the second ROADM device through the optical switch, or the service optical signal processing module transmits the service optical signal in the first direction corresponding to the first ROADM device or the second direction corresponding to the second ROADM device through the optical switch.

For example, the first station contains two ROADM devices, and the optical protection device corresponding to the service of the second station contains a service optical signal processing module and a 1×2 optical switch, wherein an input end of the 1×2 optical switch is connected to the service optical signal processing module, and two output ends are respectively connected to the first ROADM device and the second ROADM device in the first station.

In some embodiments, the optical protection device further includes an optical splitter, an input end of which is connected to the output end of the optical switch, and output ends of which are respectively connected to the first ROADM and the second ROADM.

In practical applications, one optical signal output by the optical switch is divided into multiple service optical signals through the optical splitter, which are transmitted to the first ROADM device and the second ROADM device respectively, so as to realize dual transmission and selective reception of the optical protection device.

In this way, through the service optical signal processing module and the optical switch, it is possible to receive or send service optical signals through communication links in different directions between communication stations.

Figure 3:
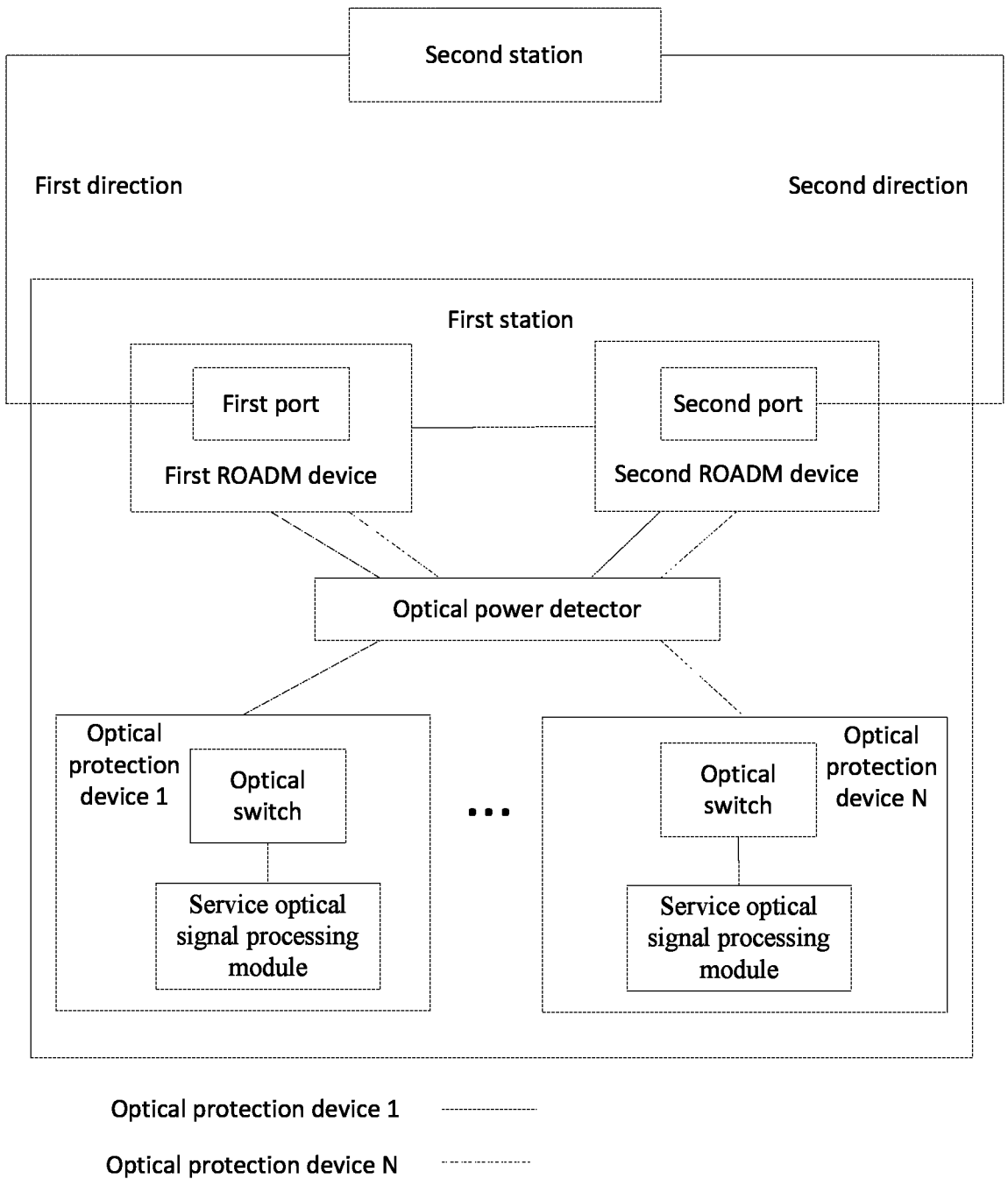
FIG. 3 is a schematic block diagram of an alternative composition structure of a communication station provided by an embodiment of the present disclosure.

In some embodiments, as shown in FIG. 3 which is a schematic block diagram of an alternative composition structure of a communication station provided by an embodiment of the present disclosure, the first station further includes:

optical power detectors which are respectively connected between the optical protection device and the first ROADM device, and between the optical protection device and the second ROADM device, and used to detect a service optical signal transmitted in the first direction and/or a service optical signal transmitted in the second direction, wherein a detection result of the optical power detector is used to determine whether the communication with the second station transmitted in the first direction or the communication with the second station transmitted in the second direction is normal; and the optical protection device which is configured to control the first station to transmit communication for performing a corresponding service with the second station in the second direction when the communication with the second station is transmitted in the first direction; or control the first station to transmit the communication for performing the corresponding service with the second station in the first direction when the communication with the second station is transmitted in the second direction.

In the embodiments of the present disclosure, the optical power detector refers to a device for measuring the absolute optical power or a relative loss of optical power passing through a section of optical fiber. For example, it may be an optical power meter, an avalanche photodiode, and a PIN photodiode, etc. The optical power detector may detect the input optical signal power of each input end in real time, and then feeds back the detection result of the optical signal power of each input end to the optical protection device as a basis for adjusting the transmission direction between communication stations.

In practical applications, optical power detectors are respectively connected between the optical protection device and the first ROADM device, and between the optical protection device and the second ROADM device. The power of the service optical signal transmitted in the first direction corresponding to the first ROADM device and the power of the service optical signal transmitted in the second direction corresponding to the second ROADM device are respectively detected by an optical power detector.

In an embodiment of the present disclosure, the first station includes the optical power detectors which are respectively connected between the optical protection device and the first ROADM device, and between the optical protection device and the second ROADM device.

The optical power detector detects the service optical signal transmitted in the first direction corresponding to the first ROADM device, and/or detects the service optical signal transmitted in the second direction corresponding to the second ROADM device. When the first station transmits the communication with the second station in the first direction, according to the detection result of the optical power detector, it is judged whether the first station transmits the communication with the second station in the first direction normally. When the detection result indicates that the first station transmits the communication between the first station and the second station in the first direction abnormally, the first station is switched by the optical protection device to the communication with the second station in the second direction. Alternatively, when the first station transmits the communication with the second station through the second direction, according to the detection result of the optical power detector, it is judged whether the first station transmits the communication with the second station through the second direction normally. When the detection result indicates that the first station transmits the communication between the first station and the second station in the second direction abnormally, the first station is switched by the optical protection device to the communication with the second station in the first direction.

In this way, the power of the service optical signal transmitted in the first direction and/or the second direction is measured by the optical power detector in the station, and the power detection result is used as the basis for the optical protection device to switch the transmission direction between communication stations. When it is detected that the current communication transmission between the communication stations is abnormal, the optical protection device switches the communication to other directions to continue the service communication between the communication stations.

In some embodiments, the output end of the optical splitter in the optical protection device is respectively connected to the input end of the first ROADM device and the input end of the second ROADM device, and the input end of the optical splitter is connected to the output end of the service optical signal processing module; the first ROADM device is configured to transmit optical signals of the first wavelength and block optical signals of other wavelengths; and the second ROADM device is configured to transmit optical signals of the second wavelength optical signals and block optical signals of other wavelengths;

wherein the optical signal of the first wavelength communicates with the second station in the first direction corresponding to the first ROADM device, and the optical signal of the second wavelength communicates with the third station in the second direction corresponding to the second ROADM device for service correspondence.

Figure 4:
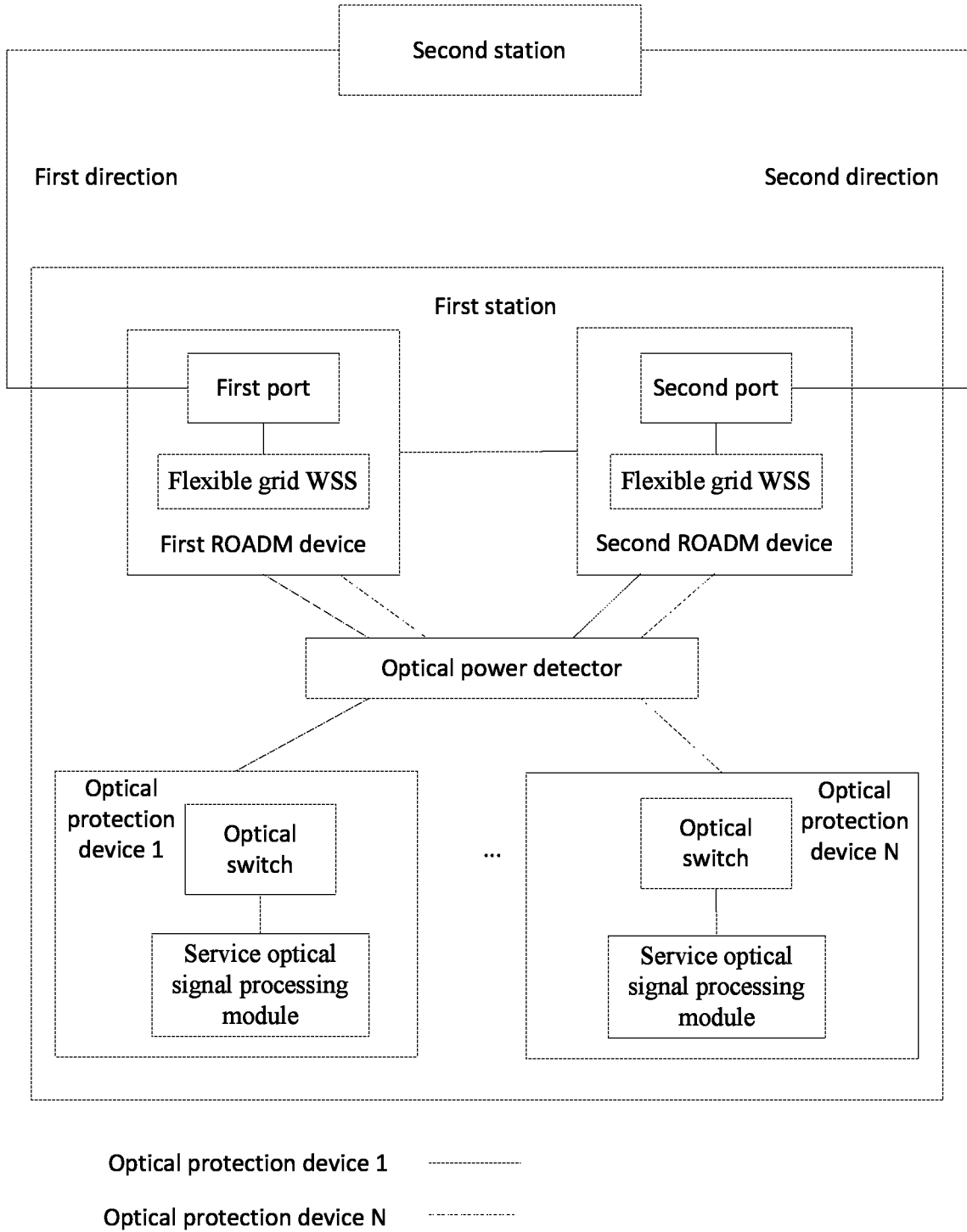
FIG. 4 is a schematic block diagram of an alternative composition structure of a communication station provided by an embodiment of the present disclosure.

In some embodiments, as shown in FIG. 4 which is a schematic block diagram of an alternative composition structure of a communication station provided by an embodiment of the present disclosure, the first ROADM device and the second ROADM device include a flexible grid optical wavelength selective switch WSS, and the flexible grid WSS is respectively connected to the optical protection device in the first station and is used to dynamically adjust the wavelength channel interval, so as to send and receive service optical signals of different wavelengths.

In the embodiment of the present disclosure, the flexible grid WSS is an important optical device in the ROADM device, which has the function of allowing any wavelength optical signal to go up and down at any port, and can support higher modulation rates, more network channels, and higher network flexibility. For example, it may be a WSS based on liquid crystal on silicon, a WSS based on liquid crystal cell array and birefringent corner wedge, etc.

In the embodiments of the present disclosure, one end of the flexible grid WSS in the ROADM device is connected to the optical protection device, and the other end is connected to the network through a cable. The flexible grid WSS dynamically adjusts the wavelength channel interval, so that service optical signals of any wavelength can pass through the add and drop ports of the flexible grid WSS, whereby the optical protection device can receive and send service optical signals of different wavelengths.

It should be noted that the flexible grid WSS may also be composed of a 1×N WSSs and an N×1 WSSs, wherein the 1×N WSS can output any wavelength combination optical signal in the wavelength multiplexed optical signal at the input end to on any output end. On the contrary, the N×1 WSSs can select any wavelength combination optical signal from any input end optical signal to combine with the wavelength combination optical signal of other input ends to output. As a result, any uplink or downlink port of the flexible grid WSSs may be uplink or downlink optical signal of any wavelength, and achieves the effect of dynamically adjusting the wavelength channel interval and sending and receiving service optical signals of different wavelengths.

In some embodiments, the first ROADM device and the second ROADM device include two flexible grid WSSs, wherein the input end of the flexible grid WSS is connected to the output of the optical splitter in the optical protection device, the input end of the optical splitter is connected to the output end of the service optical signal processing module; and the flexible grid WSS is configured to filter the received service optical signal to obtain two service optical signals with different bandwidths.

In practical applications, the optical splitter divides the wide-spectrum optical signal output by the service optical signal processing module into two broadband optical signals; the flexible grid WSS filters the received optical signals of bandwidth to form two multi-wavelength optical signals with different bandwidths, and transmits the two multi-wavelength optical signals with different bandwidths to the second station and the third station respectively in the first direction corresponding to the first ROADM device or the second direction corresponding to the second ROADM device.

In this way, the flexible grid WSS can not only dynamically adjust the wavelength channel interval to realize the transmission and reception of service optical signals of different wavelengths, but also realize the reconfigurable characteristics of ROADM device whose WSS can switch between any input and output ends, greatly improve the networking capability of the dense wavelength division multiplexing equipment.

Next, an embodiment of the present disclosure provides an optical communication system. As shown in FIG. 5 which is a schematic structural diagram of an optical communication system provided by an embodiment of the present disclosure, the system includes:

at least two communication stations, wherein communication can be performed between the two communication stations in a first direction or in a second direction, and the second direction is different from the first direction; and wherein the two communication stations are the communication stations of any one of the above FIGS. 1 to 4.

In an embodiment of the present disclosure, the two communication stations, i.e., the first station and the second station both include an optical protection device, a first ROADM device, a second ROADM device, wherein the optical protection device is connected to the first ROADM device and the second ROADM device.

The first station is connected to the second station through the first direction corresponding to the first ROADM device and the second direction corresponding to the second ROADM device, so that there are two transmission paths in different directions between the two communication stations. In addition, the first station uses the optical protection device corresponding to the service of the second station to control the service communication with the second station in the first direction corresponding to the first ROADM device, or to control the service communication with the second station in the second direction corresponding to the second ROADM device.

In actual implementation, the number of the communication stations in the optical communication system may be set according to actual needs; correspondingly, the optical protection device in the communication station may also be set according to the number of the communication stations in the optical communication system, so that the number of the optical protection device is consistent with the number of the service type transmitted by the communication station. Moreover, the number of the ROADM devices in the communication stations may also be set according to actual needs, but each communication station should include at least two ROADM devices, which respectively correspond to the transmission of service optical signals in different directions, whereby at least two transmission channels in different directions for corresponding service communication are included between communication stations.

In some embodiments, the network topology of the optical communication system includes a ring network structure; and the first direction is clockwise and the second direction is counterclockwise;

alternatively, the first direction is counterclockwise and the second direction is clockwise.

In the embodiment of the present disclosure, the ring network structure refers to that each communication station in the optical communication system is connected by a cable to form a closed ring communication line connected end to end. Each communication station in the ring network has two transmission paths in opposite directions, one direction of which is clockwise and the other direction of which is counterclockwise.

In this way, through the characteristics of the ring network, there are two service transmission paths in different directions between the communication stations, so as to protect the service communication between the communication stations.

In other embodiments, the network topology of the optical communication system includes a mesh network structure; and the first direction and the second direction correspond to different optical links between two stations communicating with each other.

In the embodiment of the present disclosure, each communication station in the optical communication system may be connected through a cable; and each communication station in the mesh network has at least two transmission links in different directions.

In this way, through the characteristics of the mesh network, there are at least two service transmission paths in different directions at the communication station, so as to protect the service communication between the communication stations.

Next, an embodiment of the present disclosure provides a data transmission method. As shown in FIG. 6 which is a schematic flowchart of a data transmission method provided by an embodiment of the present disclosure, the method is applied to the first station, and includes:

Step 601: detecting whether there is a communication abnormality when communication with a second station for a corresponding service is transmitted in a first direction corresponding to a first ROADM device included in the first station; and Step 602: switching the communication to the second direction corresponding to the second ROADM device included in the first station to communicate with the second station for corresponding services when an abnormal communication is detected.

In an embodiment of the present disclosure, the first station includes an optical protection device, a first ROADM device, and a second ROADM device. The optical protection device is connected to the first ROADM device and the second ROADM device respectively, and the first station is connected to the second station in the first direction corresponding to the first ROADM device and the second direction corresponding to the second ROADM device, so that there could be two transmission paths in different directions between the communication stations. In addition, the first station further includes an optical power detector, which is respectively connected between the optical protection device, the first ROADM device, and the second ROADM device.

When the service communication with the second station is transmitted through the first direction corresponding to the first ROADM device, an optical power detector is used to detect the power of the service optical signal transmitted in the first direction corresponding to the first ROADM device. Determine whether the communication with the second station in the first direction is abnormal according to the optical power detection result; and when an abnormality is detected in the communication, switch the communication to the second direction corresponding to the second ROADM device to transmit the communication with the second station service communication.

In some embodiments, Step 601 may include: detecting power of the service optical signal transmitted in the first direction in real time when the first direction corresponding to the first ROADM device included in the first station is used to communicate with the second station for corresponding services, and comparing the power of the transmitted service optical signal with a preset minimum power threshold, and then determining the communication with the second station in the first direction to be abnormal when the power of the service optical signal transmitted in the first direction is lower than the minimum power threshold.

It should be noted that the minimum power threshold refers to the minimum input optical power required by the optical receiving device under the condition of ensuring the bit error rate required by the service communication of the communication station. It can be set according to actual needs, and there is no specific limitation here.

In some embodiments, Step 602 includes:

When a communication abnormality is detected, switching, by the optical protection device corresponding to the communication service in the first station, the communication in the first direction corresponding to the first ROADM device to the second transmission direction corresponding to the second ROADM device included in the first station to communicate the corresponding service with the second station.

In an embodiment of the present disclosure, when the optical power detection results of the transmission path in the current direction of the first station and the second station indicate that the communication in the current direction is abnormal, the optical power detector in the first station feeds back the detection result to the optical protection device in the first station which corresponds to the communication service of the second station, the optical protection device switches, through an optical switch, the service communication in the first direction corresponding to the current first ROADM device to the second direction corresponding to the second ROADM device to transmit the service communication with the second station.

Figure 7:
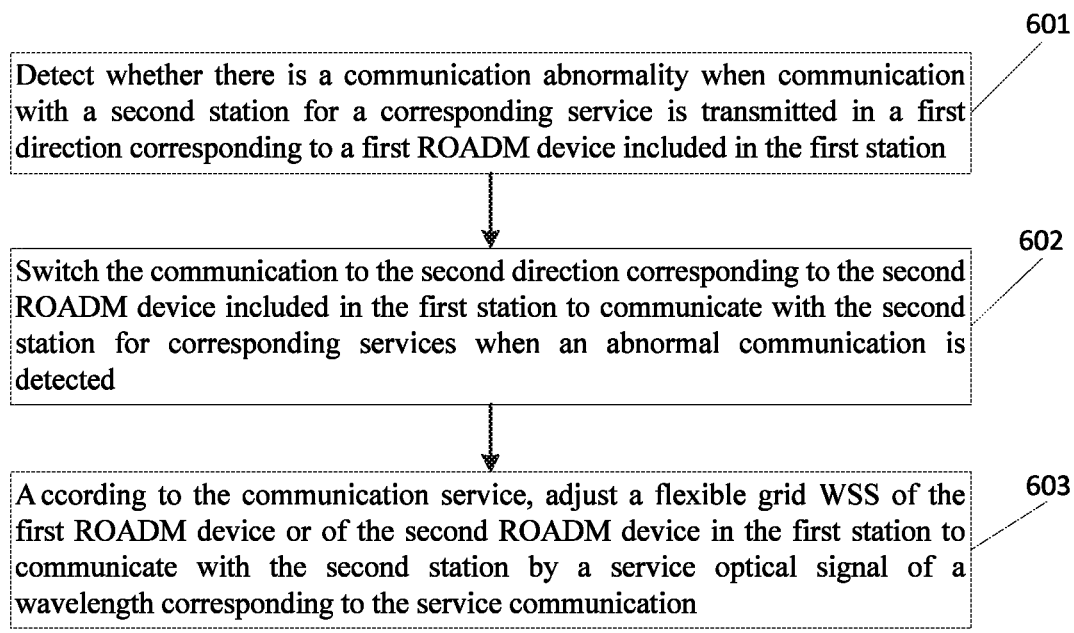
FIG. 7 is a schematic flowchart of another data transmission method provided by an embodiment of the present disclosure.
Figure 8:
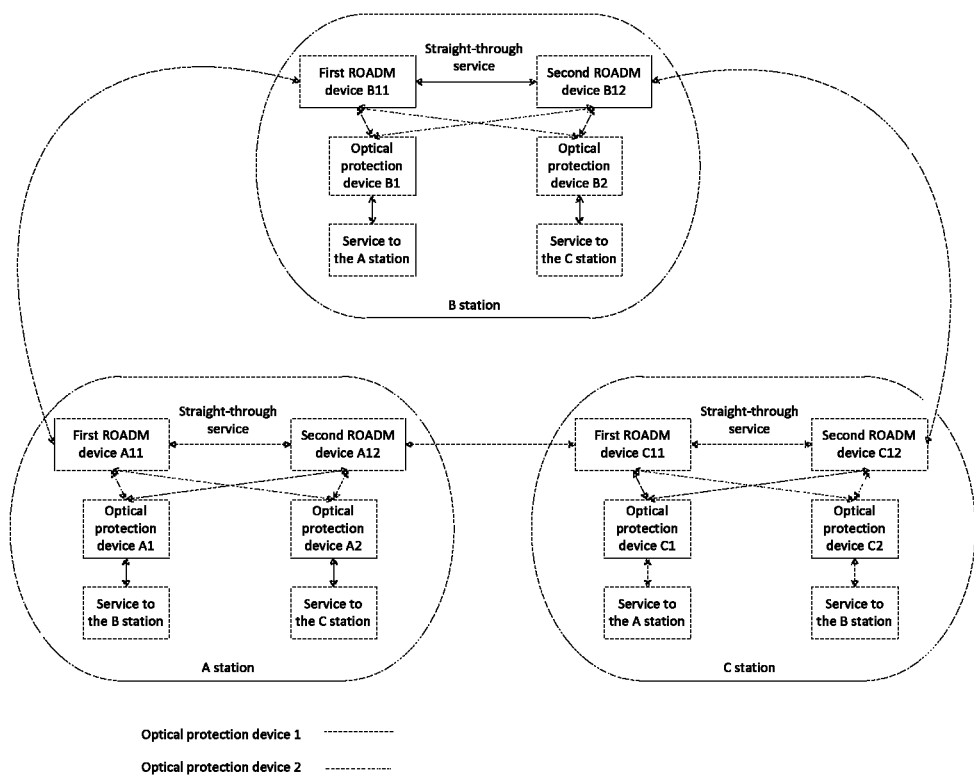
FIG. 8 is a schematic diagram of a composition structure of a three-point ring network optical communication system provided by an embodiment of the present disclosure.

In some embodiments, as shown in FIG. 7 which is a schematic flowchart of another data transmission method provided by an embodiment of the present disclosure, the method further includes:

Step 603: according to the communication service, adjusting a flexible grid WSS of the first ROADM device or of the second ROADM device in the first station to communicate with the second station by a service optical signal of a wavelength corresponding to the service communication.

In an embodiment of the present disclosure, the first ROADM device and the second ROADM device respectively include a flexible grid WSS, through which the wavelength channel interval is dynamically adjusted, so that service optical signals of any wavelength may be uplinked or downlinked through the flexible grid WSS.

In an exemplary embodiment, the present disclosure further provides a storage medium which is a computer-readable storage medium, such as a memory including a computer program, and the above computer program may be executed by a processor to complete the steps in the foregoing methods. The computer-readable storage medium may be a ferromagnetic random access memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a Magnetic Surface Memory, an Optical Disk, or CD-ROM (Compact Disc Read-Only Memory) and other memory.

In the embodiments of the present disclosure, by providing an optical protection device in a number corresponding to the number of the transmission service type in the communication station, grouping protection for different types of services is realized; for the same type of services having coincident source and destination nodes, the optical protection device is connected with the first ROADM device and the second ROADM, thereby forming two transmission links in different directions between the communication stations, so as to protect the service communication between the communication stations. Moreover, since the communication station includes two ROADM devices, when the ROADM device fails, the service communication is continued through another ROADM device, thereby realizing the protection of the ROADM device.

It should be noted that "first", "second", etc. are used to distinguish similar objects, rather than used to describe a specific order or sequence.

In addition, the technical solutions described in the embodiments of the present disclosure may be combined arbitrarily as long as no conflict occurs.

The above descriptions are only preferred embodiments of the present invention, and are not intended to limit the protection scope of the present invention.

What is claimed is:

1. A communication station, where the communication station is a first station and comprises:
   a first reconfigurable optical add-drop multiplexing (ROADM) device which includes a first port being capable of connecting a cable in a first direction of a network;
   a second ROADM device connected to the first ROADM device, which includes a second port being capable of connecting a cable in a second direction of the network, wherein the second direction is different from the first direction; and
   an optical protection device;
   wherein the optical protection device is respectively connected to the first ROADM device and the second ROADM device, and configured to control the first station to perform communication of a corresponding service with a second station in the first direction corresponding to the first ROADM device, or to perform communication of the corresponding service with the second station in the second direction corresponding to the second ROADM device, and
   wherein when a communication abnormality is detected to occur when the communication with the second station for the corresponding service is transmitted in the first direction corresponding to the first ROADM device, the optical protection device is configured to switch the communication in the first direction corresponding to the first ROADM device to the second direction corresponding to the second ROADM device to transmit communication with the second station corresponding to the service.

2. The communication station according to claim 1, wherein the optical protection device comprises a transceiver which comprises:
   a service optical signal processing module configured to send and receive service optical signals; and an optical switch including an input end connected to the service optical signal processing module, and an output end connected to the first ROADM device or the second ROADM device.

3. The communication station according to claim 1, wherein the first station further comprises:
an optical power detector respectively connected between the optical protection device and the first ROADM device and between the optical protection device and the second ROADM device, and configured to detect a service optical signal transmitted in the first direction and/or the service optical signal transmitted in the second direction, wherein a detection result of the optical power detector is configured to determine whether the communication of the corresponding service with the second station transmitted in the first direction or the communication of the corresponding service with the second station transmitted in the second direction is normal; and
the optical protection device is configured to control the first station to transmit communication for performing the corresponding service with the second station in the second direction when the communication with the second station is transmitted in the first direction or, to control the first station to transmit the communication for performing the corresponding service with the second station in the first direction when the communication with the second station is transmitted in the second direction.

4. The communication station according to claim 1, wherein the first ROADM device and the second ROADM device respectively comprise a flexible grid optical wavelength selective switch (WSS); and
the flexible grid WSSs are respectively connected to the optical protection device in the first station, and are configured dynamically adjust wavelength channel intervals to send and receive service optical signals of different wavelengths.

5. The communication station according to claim 1, wherein the optical protection device is associated with a number consistent with a number of a service type transmitted by the communication station.

6. An optical communication system comprising:
at least two communication stations, wherein the at least two communication stations comprise a first station, and the first station comprises:
a first reconfigurable optical add-drop multiplexing (ROADM) device which includes a first port being capable of connecting a cable in a first direction of a network;
a second ROADM device connected to the first ROADM device, which includes a second port being capable of connecting a cable in a second direction of the network, wherein the second direction is different from the first direction; and
an optical protection device;
wherein the optical protection device is respectively connected to the first ROADM device and the second ROADM device, and is configured to control the first station to perform communication of corresponding service with the second station in the first direction corresponding to the first ROADM device, or to perform communication of the corresponding service with the second station in the second direction corresponding to the second ROADM device;
wherein when a communication abnormality is detected to occur when the communication with the second station for the corresponding service is transmitted in the first direction corresponding to the first ROADM device, the optical protection device is configured to switch the communication in the first direction corresponding to the first ROADM device to the second direction corresponding to the second ROADM device to transmit communication with the second station corresponding to the service; and
wherein the communication is capable of being performed between the two communication stations in a first direction or a second direction, and the second direction is different from the first direction.

7. The system according to claim 6, wherein a network topology of the optical communication system comprises a ring network structure; and
the first direction is clockwise and the second direction is counterclockwise, or the first direction is counterclockwise and the second direction is clockwise.

8. The system according to claim 6, wherein a network topology of the optical communication system comprises a mesh network structure; and
the first direction and the second direction correspond to different optical links between two stations communicating with each other.

9. The optical communication system according to claim 6, wherein the optical protection device comprises a transceiver which comprises:
a service optical signal processing module configured to send and receive service optical signals; and
an optical switch including an input end connected to the service optical signal processing module, and an output end connected to the first ROADM device or the second ROADM device.

10. The optical communication system according to claim 6, wherein the first station further comprises:
an optical power detector respectively connected between the optical protection device and the first ROADM device and between the optical protection device and the second ROADM device, and configured to detect a service optical signal transmitted in the first direction and/or the service optical signal transmitted in the second direction, wherein a detection result of the optical power detector determines whether the communication with the second station transmitted in the first direction or the communication with the second station transmitted in the second direction is normal; and
the optical protection device is configured to control the first station to transmit communication for performing the corresponding service with the second station in the second direction when the communication with the second station is transmitted in the first direction or, to control the first station to transmit the communication for performing the corresponding service with the second station in the first direction when the communication with the second station is transmitted in the second direction.

11. The optical communication system according to claim 6, wherein the first ROADM device and the second ROADM device respectively comprise a flexible grid optical wavelength selective switch (WSS); and
the flexible grid WSSs are respectively connected to the optical protection device in the first station, and are configured to dynamically adjust wavelength channel intervals to send and receive service optical signals of different wavelengths.

12. The system according to claim 6, wherein the optical protection device is associated with a number consistent with a number of a service type transmitted by the communication station.

13. A data transmission method applied to a first station, comprising:
    detecting whether a communication abnormality occurs when communication with a second station for a corresponding service is transmitted in a first direction corresponding to a first ROADM device included in the first station; and
    when the communication abnormality is detected, switching the communication to a second direction corresponding to a second ROADM device included in the first station to transmit the communication with the second station for the corresponding service, comprising:
    when the communication abnormality is detected, switching, by an optical protection device in the first station corresponding to the communication service, the communication in the first direction corresponding to the first ROADM device to the second direction corresponding to the second ROADM device included in the first station to transmit communication with the second station corresponding to the service.

14. The method according to claim 13, wherein the method further comprises:
    according to the communication service, adjusting a flexible grid optical wavelength selection switch WSS of the first ROADM device or of the second ROADM device in the first station, for performing communication with the second station by a service optical signal corresponding to the service wavelength.

* * * * *